US012442461B2

(12) United States Patent
Kolb

(10) Patent No.: US 12,442,461 B2
(45) Date of Patent: Oct. 14, 2025

(54) VALVE ASSEMBLY

(71) Applicant: A. Raymond et cie, Grenoble (FR)

(72) Inventor: Christian Kolb, Binzen (DE)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 18/351,228

(22) Filed: Jul. 12, 2023

(65) Prior Publication Data

US 2024/0017699 A1 Jan. 18, 2024

(30) Foreign Application Priority Data

Jul. 12, 2022 (EP) ..................................... 22315143

(51) Int. Cl.
*F16K 27/00* (2006.01)
*F15B 13/08* (2006.01)

(52) U.S. Cl.
CPC ........ *F16K 27/003* (2013.01); *F15B 13/0821* (2013.01)

(58) Field of Classification Search
CPC .... F16K 27/003; F16K 27/00; F15B 13/0803; F15B 13/0807; F15B 13/0814; F15B 13/0821; F15B 13/0825; F15B 13/0882; F15B 13/0892
See application file for complete search history.

(56) References Cited

U.S. PATENT DOCUMENTS

| | | | | |
|---|---|---|---|---|
| 3,521,664 A | * | 7/1970 | Medici | F16K 27/003 248/27.1 |
| 4,483,365 A | * | 11/1984 | Fallon | F16K 27/003 137/271 |
| 5,048,564 A | * | 9/1991 | Gaiardo | F16K 47/04 137/601.15 |

(Continued)

FOREIGN PATENT DOCUMENTS

| DE | 102013205273 A1 | 10/2013 |
|---|---|---|
| EP | 3792535 A1 | 3/2021 |

(Continued)

OTHER PUBLICATIONS

European Extended Search Report for Application No. 22315143.2 dated Jan. 23, 2024, 5 pages.

*Primary Examiner* — Michael R Reid
(74) *Attorney, Agent, or Firm* — TraskBritt

(57) ABSTRACT

A valve assembly comprises a fastening element and at least one valve configured to be removably mounted to the fastening element. The fastening element includes a fastening body and a plurality of fastening islands. The fastening element has an elongated shape along a direction of elongation and is configured to be fastened in an automotive vehicle by at rear face of the fastening body. The fastening body comprises a plurality of openings aligned along the direction of elongation, each fastening island being housed in a respective through opening and is mechanically coupled to the fastening body by flexible means. The valve includes (Continued)

a casing, and is configured to be removably mounted in a mounted position to a respective fastening island at a front face thereof by attachment means configured to mount the valve to the fastening island according to a sliding movement and/or a rotating movement.

18 Claims, 7 Drawing Sheets

(56) References Cited

U.S. PATENT DOCUMENTS

| | | | | |
|---|---|---|---|---|
| 5,289,844 | A * | 3/1994 | Stevenson | F16B 2/065 251/367 |
| 6,481,409 | B1 * | 11/2002 | Wade | F01L 9/10 123/198 F |
| 6,966,338 | B2 | 11/2005 | Flynn et al. | |
| 8,267,375 | B1 * | 9/2012 | LaHousse | F15B 13/0405 403/381 |
| 8,944,106 | B2 * | 2/2015 | Morgan | F16K 27/003 137/884 |
| 2021/0001811 | A1 | 1/2021 | Cosby et al. | |

FOREIGN PATENT DOCUMENTS

| | | | | |
|---|---|---|---|---|
| GB | 2331575 A * | 5/1999 | | F16K 27/003 |
| WO | 2016/129789 A1 | 8/2016 | | |

* cited by examiner

VALVE ASSEMBLY

CROSS-REFERENCE TO RELATED APPLICATIONS

This application claims priority to and the benefit of the filing date of European Patent Application Serial No. 22315143.2, filed Jul. 12, 2022, for "Valve Assembly," the disclosure of which is hereby incorporated herein in its entirety by this reference.

TECHNICAL FIELD

The present disclosure relates to a valve assembly. In particular, the present disclosure concerns a valve assembly configured for cleaning at least one sensor of an automotive vehicle and, in particular, an autonomous vehicle.

BACKGROUND

Automotive vehicles are now equipped with many sensors, cameras, lidars or radars (hereinafter "sensors") for driving assistance purposes. These sensors may be located inside or outside the vehicle in order to offer the driver complete visibility of the environment in which the vehicle is located. For example, sensors may be located in the bumper, in the side-skirt, on the side mirror, behind the windshield, under the hood, near the headlamps, on a roof pod.

However, these sensors, exposed to the environment, are likely to be covered with dirt or dust, and consequently may encounter performance degradations. Frequent cleaning of these sensors is therefore required to guarantee their performance.

In this respect, automotive vehicles may be provided with a cleaning system comprising valves, which are generally mounted in extremely dense areas, so that the valve assembly requires compact packaging.

In addition, there are situations for which modularity and scalability of a valve assembly are needed. Notably, the number of valves needed may depend on the number of surfaces or sensors to be cleaned.

One purpose of the present disclosure is therefore to propose a valve assembly that is compact and can be easily operated when maintenance is required.

Another purpose of the present disclosure is to propose a valve assembly that is modular and scalable.

BRIEF SUMMARY

The purposes of the present disclosure are, at least partly, achieved by a valve assembly in a vehicle, the valve assembly comprising:
- a fastening element provided with a fastening body and a plurality of fastening islands, the fastening body being of longitudinal shape along a direction of elongation, and configured to be fastened in a vehicle, each fastening island having a face referred to as the fastening face, and being mechanically bonded to the fastening body by flexible means;
- at least one valve provided with a casing, the valve being configured to be removably mounted, in a position referred to as the mounted position, to one of the fastening islands by the fastening face of the fastening island, via attachment means, the attachment means being configured to mount the valve to one of the fastening islands according to a sliding movement and/or a rotating movement.

According to one embodiment, the valve assembly further comprises locking means configured to lock a valve mounted on a fastening island into its mounted position.

According to one embodiment, the flexible means comprise spring elements.

According to one embodiment, the fastening body comprises a plate provided with a plurality of through openings, extending from a front face toward a rear face of the plate, and aligned along the direction of elongation, each of the fastening islands being housed in one of the through openings so that the attachment means are accessed by the front face.

According to one embodiment, the spring elements extend from a contour of the fastening islands toward a sidewall delimiting the through opening housing the respective fastening island.

According to one embodiment, the fastening body comprises a rod having a square or a rounded section, the fastening islands being mechanically bonded to a lateral surface of the fastening body by the flexible means.

According to one embodiment, the spring element is intercalated in between a face of the fastening element opposite to its fastening face, and the lateral surface.

According to one embodiment, the spring element comprises at least one flexible ring.

According to one embodiment, the attachment means comprise sliding means, the sliding means being provided with a first sliding component and a second sliding component, cooperating together, and located, respectively, on a side surface of the casing and on the fastening face of the fastening island.

According to one embodiment, the first sliding component and the second sliding component are arranged so that, the assembling of the valve to one of the fastening islands involves a sliding movement in a plane defined by the fastening face and along a direction referred to as the sliding direction, perpendicular to the direction of elongation.

According to one embodiment, the first sliding component and/or the second sliding component are arranged so that the sliding movement can also be executed along a direction opposite to the sliding direction.

According to one embodiment, the locking means comprises a flexible tab and a stop, the flexible tab being integral with one or the other of the fastening island and the casing of the valve, while the stop being located on the other of the fastening island and the casing of the valve, the flexible tab being arranged to cooperate with the stop to lock the valve in the mounted position.

According to one embodiment, the at least one valve comprises a fluid supply conduit extending along the direction of elongation from an inlet toward an outlet, the fluid supply conduit being configured to laterally distribute a fluid injected into the inlet to the considered valve.

According to one embodiment, the fluid supply conduit of a valve has its outlet fluidly connected to the inlet of the fluid supply conduit of an immediately adjacent valve in the direction of elongation.

According to one embodiment, the valve and the immediately adjacent valve constitute a dual valve.

According to one embodiment, the valve and the immediately adjacent valve each comprise a second fluid supply conduit, the second fluid supply conduit extending along the direction of elongation from a second inlet toward a second outlet, the second fluid supply conduit being configured to laterally distribute a second fluid injected into the second inlet to the respective valve.

According to one embodiment, the second fluid supply conduit of the valve has its second outlet fluidly connected to the second inlet of the second fluid supply conduit of the valve immediately adjacent.

The present disclosure also includes a vehicle provided with at least one valve assembly according to the present disclosure.

BRIEF DESCRIPTION OF THE DRAWINGS

Other features and advantages will be better understood after reading the following description of the valve assembly according to the present disclosure, provided as non-limiting examples only, with reference to the accompanying drawings in which.

DETAILED DESCRIPTION

Figure 1:
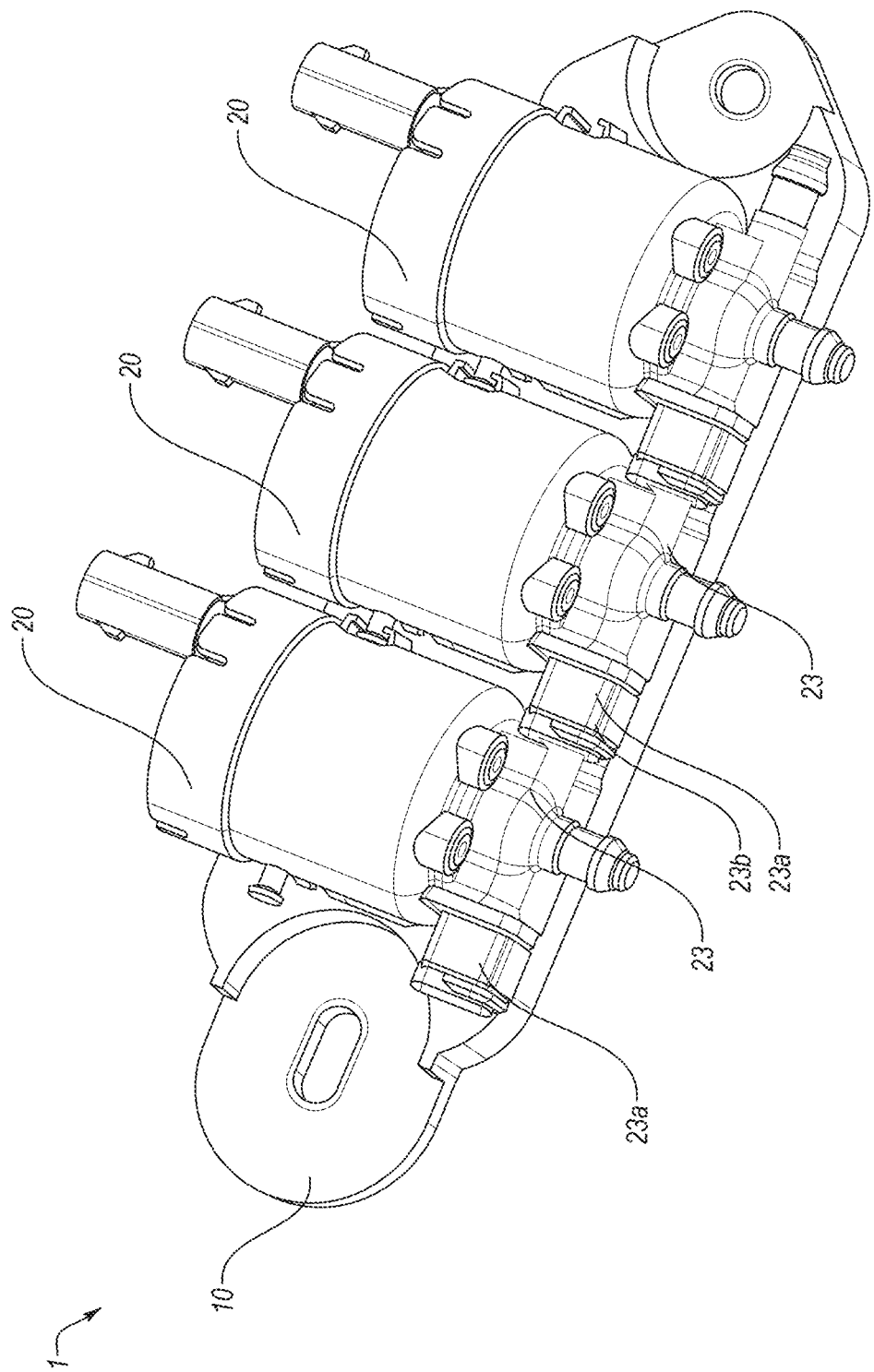
FIG. 1 is a diagrammatic illustration of a valve assembly according to a first embodiment of the present disclosure.

In the descriptive part, the same references in the drawings may be used for elements of the same type. The drawings are schematic representations, which, for ease of illustration, are not necessarily to scale.

The present disclosure relates to a valve assembly for the cleaning of sensors, cameras, lidars or radars (hereafter "sensors"), notably for the cleaning of sensors of an automotive vehicle.

In particular, the present disclosure relates to a valve assembly for an automotive vehicle, the valve assembly comprising:

a fastening element provided with a fastening body and a plurality of fastening islands, the fastening body being of longitudinal shape along a direction of elongation, and configured to be fastened in an automotive vehicle, each fastening island having a face referred to as the fastening face, and being mechanically bonded to the fastening body by flexible means;

at least one valve provided with a casing, the valve being configured to be removably mounted, in a position referred to as the mounted position, to one of the fastening islands by the fastening face of the fastening island, via attachment means, the attachment means being configured to mount the valve to one of the fastening islands according to a sliding movement and/or a rotating movement.

According to specific embodiments, the fastening body can comprise at least one element chosen from among a plate or a rod.

However, the present disclosure is not limited to those specific embodiments.

FIG. 1 is a diagrammatic illustration of a valve assembly 1 according to a first embodiment of the present disclosure.

Notably, the valve assembly 1 comprises a fastening element 10 and at least one valve 20. The valve assembly 1 shown in FIG. 1 comprises three valves. However, the present disclosure is not limited to a valve assembly having three valves, and the valve assembly 1 may have one or any number of valves 20. In particular, and according to the present disclosure, the valve assembly is both modular and scalable. In other words, those skilled in the art, depending on the space available for installing the valve assembly into an automotive vehicle and the needs in terms of fluid distribution, may consider adapting the valve assembly. As non-limiting examples, the valve assembly 1 can be installed in at least one location chosen from among an engine compartment, a bumper, a fender, a roof, a quarter panel, or a trunk tailgate.

Figure 2:
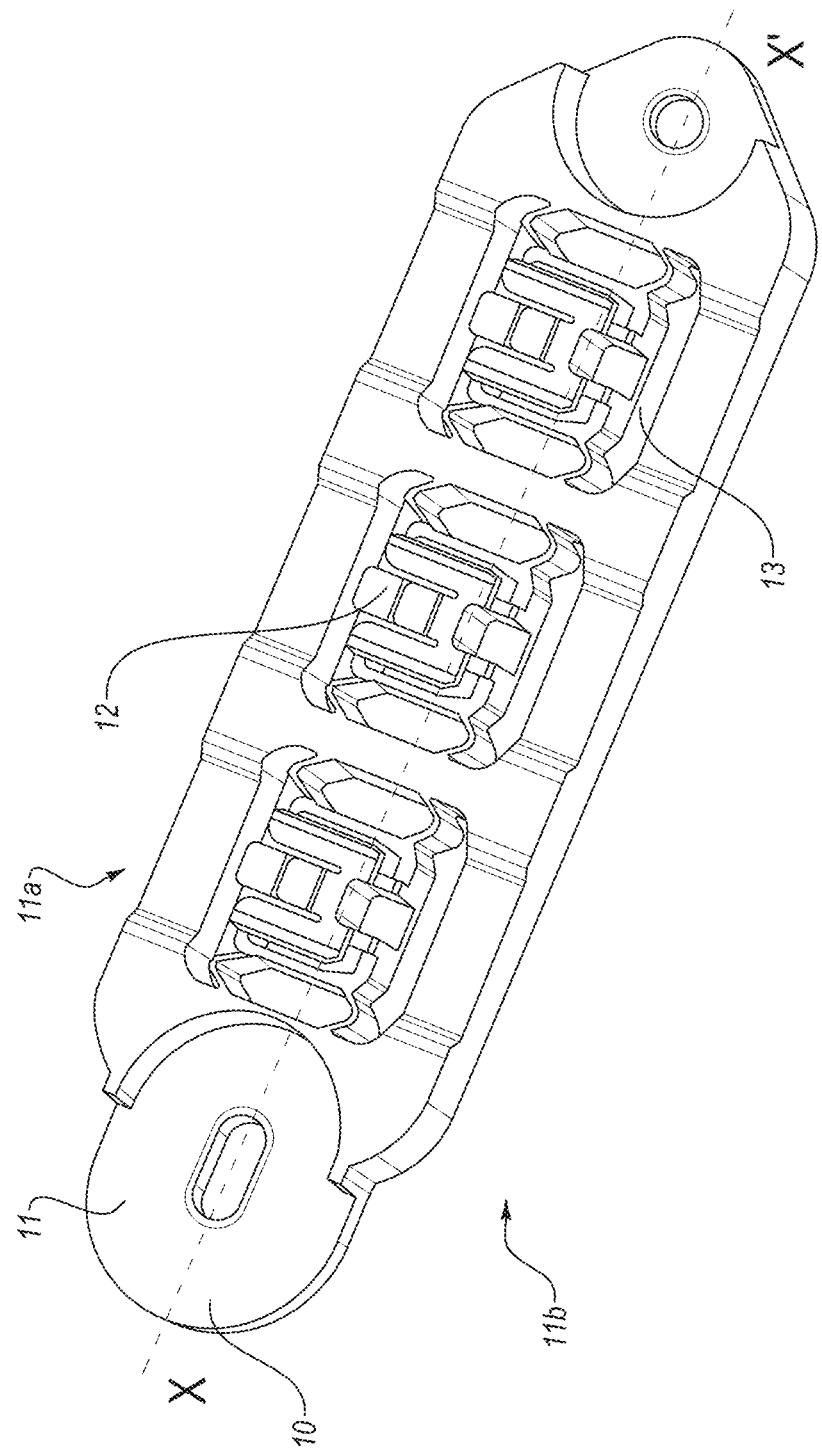
FIG. 2 is a diagrammatic illustration of a front face of a fastening element implemented in the valve assembly of FIG. 1.

FIG. 2 is a diagrammatic representation of the fastening element 10. Notably, the fastening element 10 comprises a fastening body 11 and at least one fastening island 12, for example, two or three fastening islands 12 as shown in FIG. 2.

The fastening body 11 is of longitudinal shape along a direction of elongation represented in FIG. 2 by the line XX'. In this specific embodiment, the fastening body 11 comprises a plate having a front face 11a and a rear face 11b opposite to the front face.

By "longitudinal shape," it is meant that the length of the fastening body is at least two times its width.

For example, the length of the fastening body 11 can be in the range of from 100 mm to 200 mm. Similarly, the width of the fastening body 11 can be in the range of from 30 mm to 80 mm. Similarly, the thickness of the fastening body 11 can be in the range of from 8 mm to 20 mm.

The plate forming the fastening body 11 has a front face 11a and a rear face 11b opposite to the front face 11a. In particular, the fastening body 11 is configured to be fastened in an automotive vehicle by its rear face 11b. In this regard, the fastening body 11 may be fastened in the automotive body with attaching means, such as, for example, a double-sided adhesive tape or screws.

Figure 3:
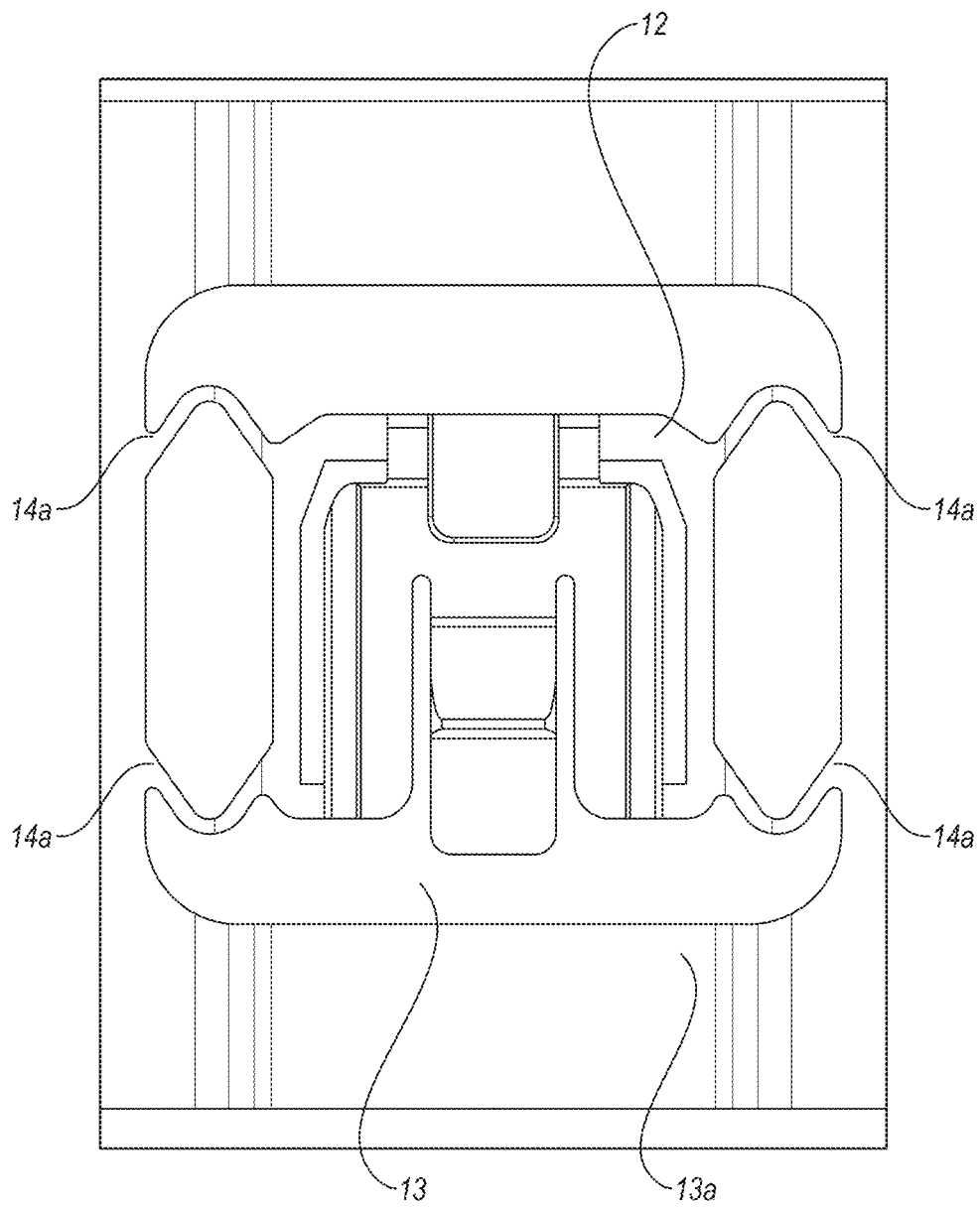
FIG. 3 is a view of a front face of a fastening island illustrated in FIG. 2 and illustrates a flexible means of the fastening island.

The plate forming the fastening body 11 also comprises through openings 13 aligned along the direction of elongation XX' (FIG. 3).

Each through opening 13 may be of square or rectangular shape and may have rounded corners. Notably, each through opening 13 is delimited by a sidewall 13a.

As depicted in FIG. 2 and according to the present disclosure, each fastening island 12 is housed in a through opening 13 and is mechanically bonded to the fastening body by flexible means 14a. Notably, the flexible means 14a may comprise spring elements extending from a contour of the fastening islands 12 toward the sidewall delimiting the through opening housing the respective fastening island 12. More particularly, the fastening island 12 may be suspended within the through opening by the spring elements. In the example depicted in FIG. 2, each fastening island 12 may be bonded to the fastening body by four spring elements, and particularly by four V-shape spring elements.

The flexible means 14a render the valve assembly less sensitive to vibrations caused during operation of a valve mounted on the assembly.

The at least one valve 20 may comprise an e-valve as described in the European Patent Application EP 3792535 A1, the disclosure of which is hereby incorporated herein in its entirety by this reference. In particular, the at least one valve 20 comprises a casing 21 (FIG. 5) delimited at least by a side surface 22. According to the present disclosure, the valve 20 is configured to be removably mounted in a position referred to as the mounted position, to one of the fastening islands 12 at the front face 11a of the fastening body 11 opposite to the rear face 11b.

Notably, the assembly of a valve 20 to a fastening island 12 involves attachment means that are configured to mount the valve to one of the fastening islands according to a sliding movement and/or a rotating movement.

Figure 4:
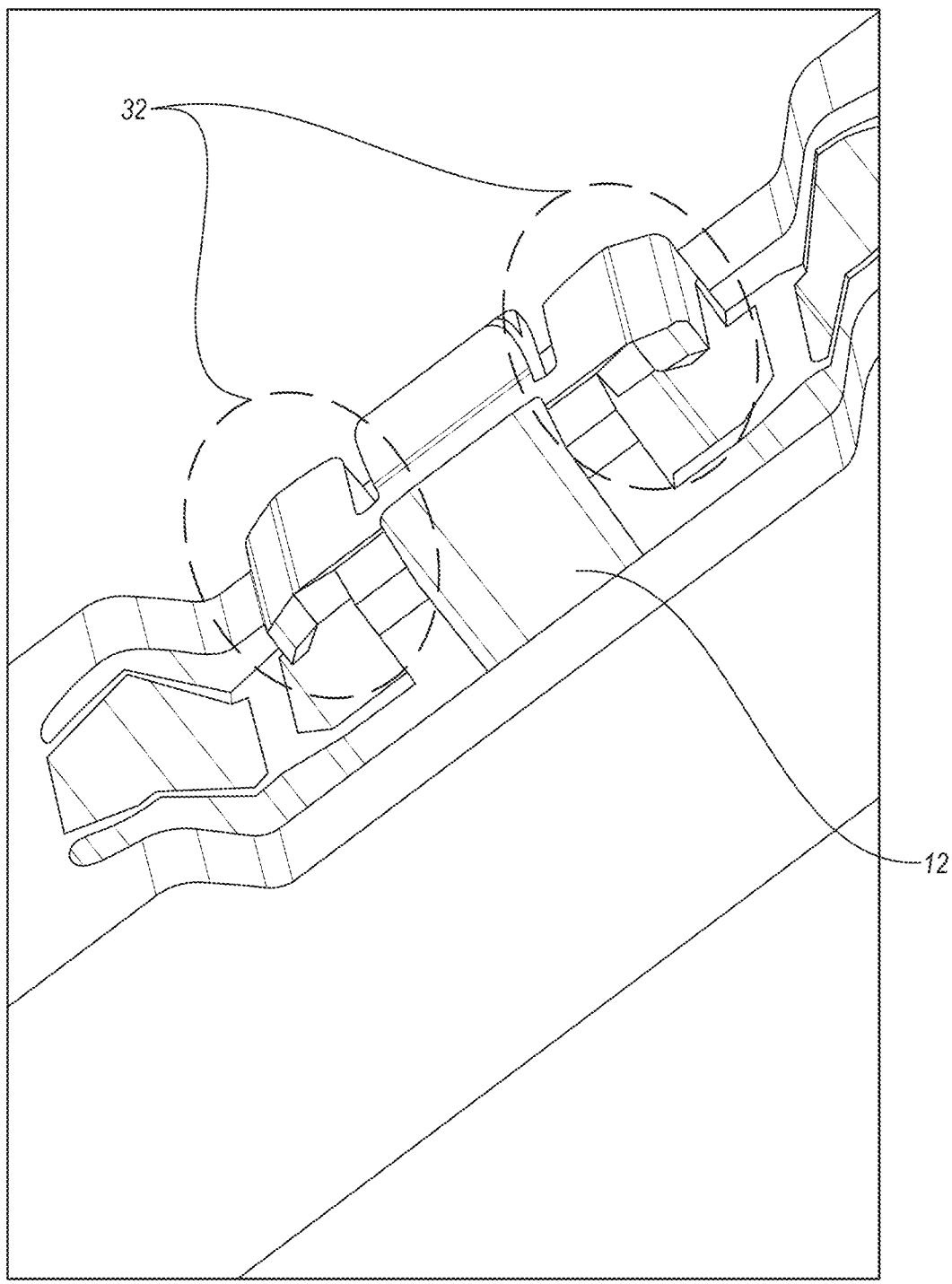
FIG. 4 is a perspective view of the fastening island of FIG. 3 and illustrates a second sliding component.
Figure 5:
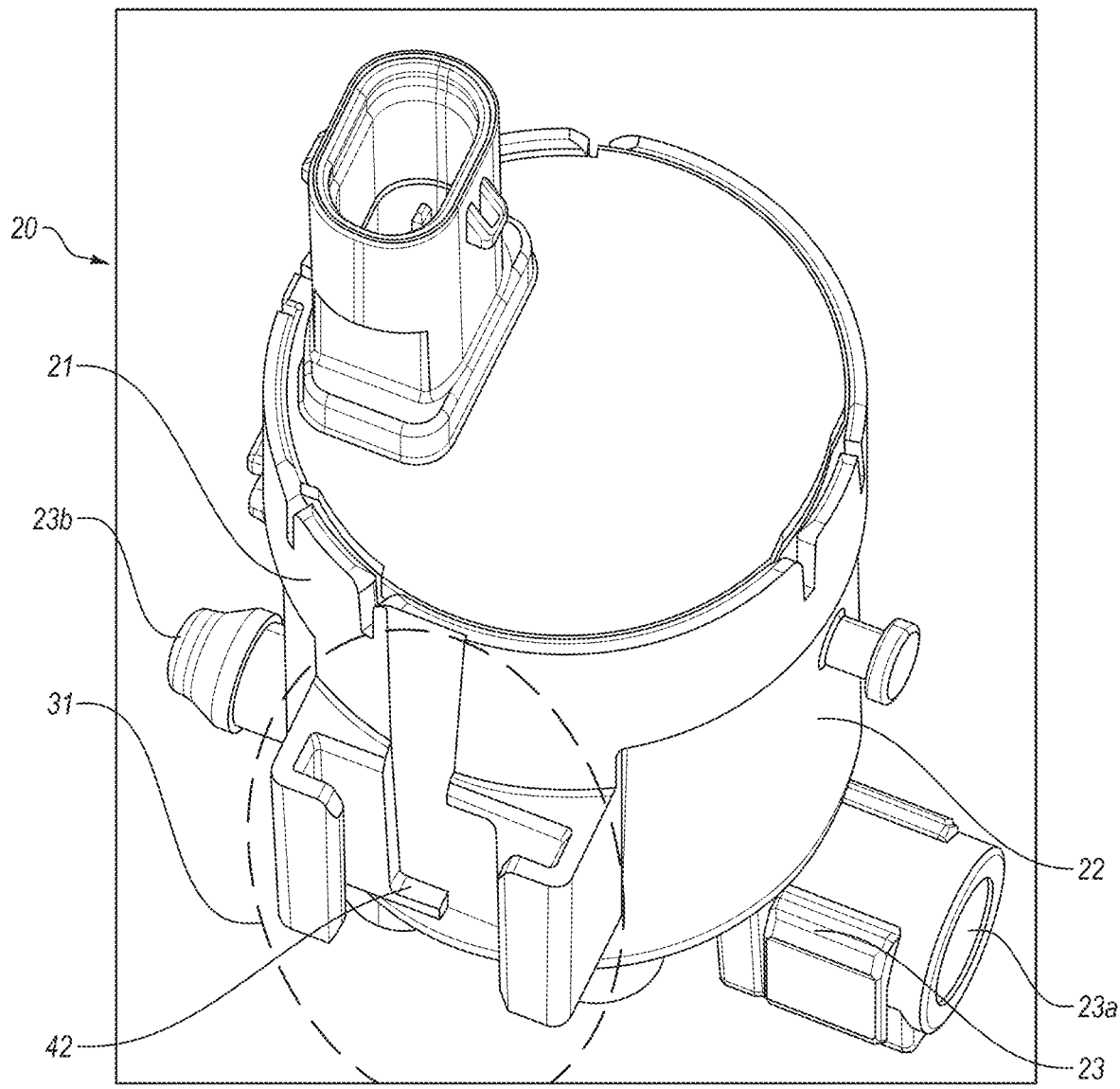
FIG. 5 is a perspective view of a valve of the valve assembly of FIG. 1.

Therefore, the attachment means may comprise sliding means. In this regard, the sliding means may comprise a mechanically interlocking guide, such as, for example, dovetail type joint means. In particular, and as illustrated in FIG. 4 and FIG. 5, the sliding means may include a first sliding component 31 and a second sliding component 32, configured to cooperate together, and located, respectively, on a side surface 22 of the casing 21 and on a face referred to as the fastening face 12a of the fastening island 12 and opposite to the rear face 11b of the fastening body 11. The cooperation between the first sliding component 31 and the second sliding component 32 is a sliding cooperation that allows the first sliding component 31 to slide relative to the second sliding component 32. In particular, the first sliding component 31 and the second sliding component 32 can comprise, respectively, a counter-slider and a slider (FIG. 4 and FIG. 5).

Notably, the first sliding component 31 and the second sliding component 32 may be arranged and configured so that the assembly of the valve 20 to one of the fastening islands 12 involves a sliding movement in a plane defined by the front face 11a and along a direction referred to as the sliding direction, perpendicular to the direction of elongation XX'. The present disclosure is not limited to those sole sliding directions. In a complementary or alternative way, the assembling of the valve 20 to one of the fastening islands 12 may involve a sliding movement along the direction of elongation.

Advantageously, the first sliding component 31 and/or the second sliding component 32 are arranged so that the sliding movement can also be executed along a direction opposite to the sliding direction.

The present disclosure is not limited to the implementation of sliding means as previously described. In particular, the assembling of a valve to one of the fastening islands 12 may involve a rotating movement.

The valve assembly further comprises locking means configured to lock a valve 20 mounted on a fastening island 12 into its mounted position.

Figure 6:
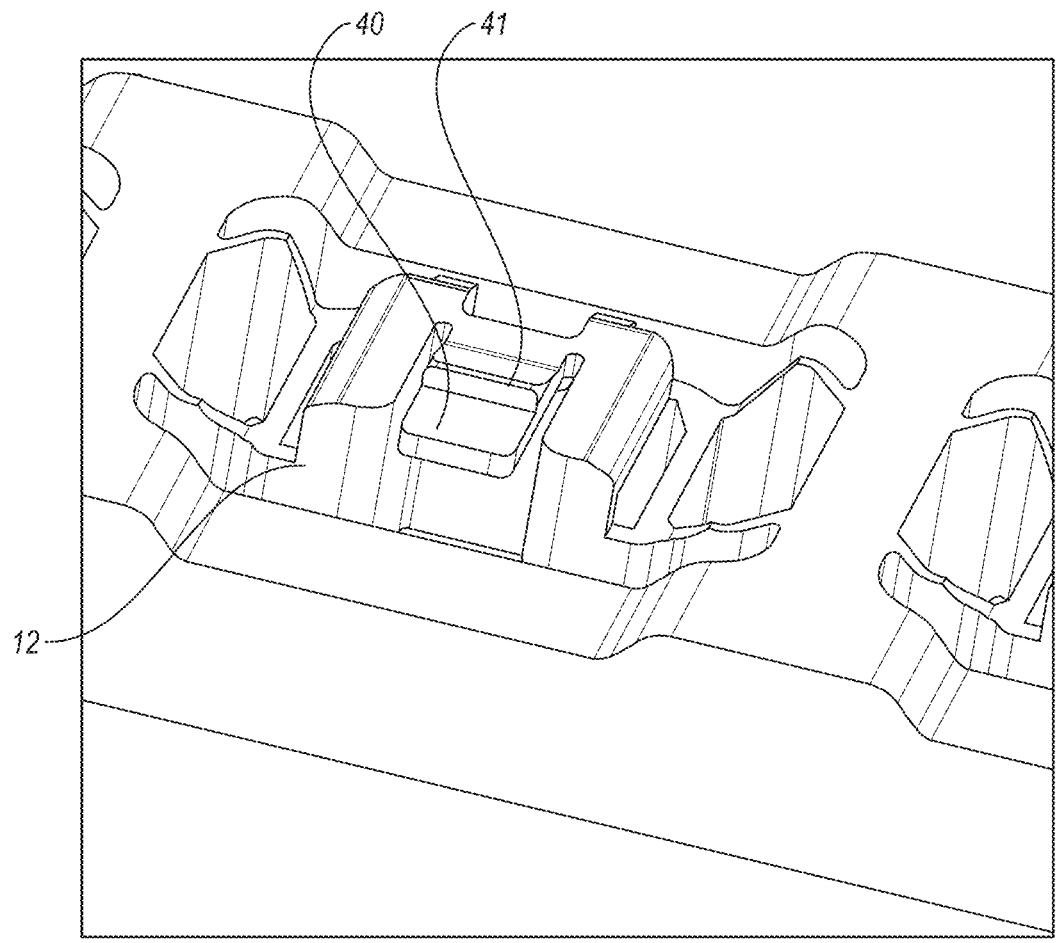
FIG. 6 is a perspective view of the fastening island shown in FIG. 2.

For example, the locking means may comprise a flexible tab and a stop. In this regard, the flexible tab 40 is integral with one or the other of the fastening island 12 and the casing 21 of the valve, while the stop 42 is located on the other of the fastening island 12 and the casing 21 of the valve 20. Notably, the flexible tab 40 comprises a lug 41 arranged to cooperate with the stop 42 to mechanically lock the valve 20 in the mounted position (FIG. 5 and FIG. 6). The present disclosure is not limited to this configuration, and any other suitable locking means may be employed in additional embodiments of the present disclosure. Notably, in embodiments in which the valve can be assembled with a locking island 12 by a sliding motion along the sliding direction, lugs 41 (FIG. 6) can be positioned at the ends of the counter slider.

The valve 20 can comprise a fluid supply conduit 23 extending along the direction of elongation XX' from an inlet 23a toward an outlet 23b. The fluid supply conduit 23 is configured to laterally distribute a fluid injected into the inlet of the respective valve.

Advantageously, and as illustrated in FIG. 1, the fluid supply conduit 23 of a valve 20 has its outlet 23b fluidly connected to the inlet 23a of the fluid supply conduit 23 of an immediately adjacent valve 20 along the direction of elongation.

The present disclosure also relates to a second embodiment, that differs from the first embodiment in that the valve 20 and an immediately adjacent valve 20 constitute a dual valve. Notably, the valve 20 and the immediately adjacent valve 20 each comprise, in addition to the fluid supply conduit 23, a second fluid supply conduit. The second fluid supply conduit extends along the direction of elongation from a second inlet toward a second outlet. The second fluid supply conduit is notably configured to laterally distribute a second fluid injected into the second inlet to the respective valve 20. For example, the fluid injected in a fluid supply conduit 23 may be a liquid, while the fluid injected in the second fluid supply conduit may be a gas.

Advantageously, the second fluid supply conduit of the valve has its second outlet fluidly connected to the second inlet of the second fluid supply conduit of the immediately adjacent valve.

The present disclosure also concerns a third embodiment, which differs from the first and the second embodiment in that the fastening body comprises a rod rather than a plate. Notably, the rod can comprise a square-like or a circular-like shape.

Figure 7:
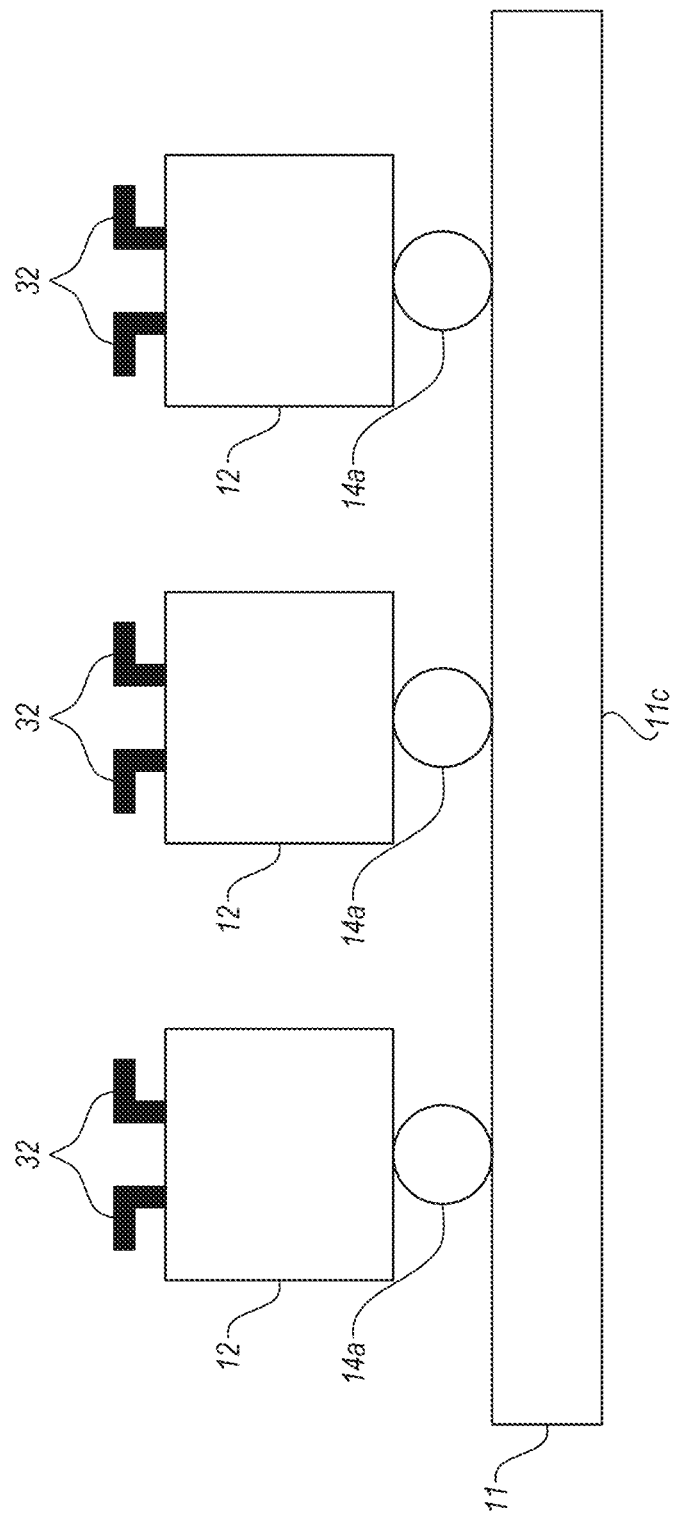
FIG. 7 is a diagrammatic illustration of a fastening element according to a third embodiment of the present disclosure.

According to this third embodiment illustrated in FIG. 7, the fastening islands 12 are mechanically bonded to the rod forming the fastening body 11 to its lateral surface 11c via the flexible means, and notably by a spring element.

In particular, a spring element is intercalated between a face of the fastening element opposite to its fastening face, and the lateral surface. In this regard, the spring element may comprise at least one flexible ring.

The present disclosure also includes an automotive vehicle provided with at least one valve assembly according to the present disclosure.

Of course, the present disclosure is not limited to the embodiments described and variant embodiments can be made without departing from the scope of the invention as defined by the claims.

What is claimed is:

1. A valve assembly for a vehicle, the valve assembly comprising:
    a fastening element including a fastening body, a plurality of fastening islands, and a flexible means disposed between the fastening body and each of the plurality of fastening islands, the fastening body being of longitudinal shape along a direction of elongation, and configured to be fastened in a vehicle, and each fastening island having a fastening face, each fastening island being mechanically bonded to the fastening body by the flexible means; and
    at least one valve having a casing, the at least one valve being configured to be removably mounted in a mounted position to a fastening island of the plurality of fastening islands at the fastening face of the fastening island by attachment means, the attachment means being configured to mount the valve to one of the fastening islands according to a sliding movement.

2. The valve assembly of claim 1, wherein the valve assembly further comprises locking means configured to lock the at least one valve on the fastening island in the mounted position.

3. The valve assembly of claim 2, wherein the flexible means comprises at least one spring element.

4. The valve assembly of claim 3, wherein the fastening body comprises a plate having a plurality of through openings extending from a front face of the plate toward a rear face of the plate, the through openings of the plurality being aligned along the direction of elongation, each fastening island of the plurality being housed in one of the through openings so that the attachment means are accessible at the front face of the plate.

5. The valve assembly of claim 4, wherein the spring element extends from a contour of a fastening island of the plurality toward a sidewall of the plate delimiting a through opening of the plurality housing the respective fastening island.

6. The valve assembly of claim 3, wherein the fastening body comprises a rod, the fastening islands being mechanically bonded to a lateral surface of the fastening body by the flexible means.

7. The valve assembly of claim 6, wherein the rod has a square or rounded section.

8. The valve assembly of claim 6, wherein the spring element is intercalated between a face of the fastening element opposite to the fastening face, and the lateral surface of the fastening body.

9. The valve assembly of claim 8, wherein the spring element comprises at least one flexible ring.

10. The valve assembly of claim 1, wherein the attachment means comprise sliding means, the sliding means including a first sliding component and a second sliding component configured to mechanically cooperate together, and located, respectively, on a side surface of the casing of the valve and on the fastening face of the fastening island, the first sliding component and the second sliding component being configured and arranged so that, the assembling of the valve to one of the fastening islands involves a sliding movement in a plane defined by the fastening face and along a sliding direction perpendicular to the direction of elongation.

11. The valve assembly of claim 10, wherein at least one of the first sliding component and the second sliding component is arranged so that the sliding movement can also be executed along a direction opposite to the sliding direction.

12. The valve assembly of claim 2, wherein the locking means comprises a flexible tab and a stop, the flexible tab being integral with one or the other of the fastening island and the casing of the valve, the stop being located on the other of the fastening island and the casing of the valve, the flexible tab being arranged to cooperate with the stop to lock the valve in the mounted position.

13. The valve assembly of claim 1, wherein the at least one valve comprises a fluid supply conduit extending along the direction of elongation from an inlet toward an outlet, the fluid supply conduit being configured to laterally distribute a fluid injected into the inlet to the respective valve.

14. The valve assembly of claim 13, wherein the outlet of the fluid supply conduit of the at least one valve is fluidly connected to an inlet of a fluid supply conduit of an immediately adjacent valve along the direction of elongation.

15. A vehicle comprising at least one valve assembly according to claim 1.

16. A valve assembly for a vehicle, the valve assembly comprising:
a fastening element including a fastening body, and a plurality of fastening islands, and a flexible body disposed between the fastening body and each of the plurality of fastening islands, the fastening body having a longitudinal shape along a direction of elongation, each fastening island having a fastening face, and each fastening island of the plurality mechanically coupled with the fastening body by the flexible body; and
at least one valve having a casing, the at least one valve configured to be removably mounted in a mounted position to a fastening island of the plurality of fastening islands at the fastening face of the fastening island by an attachment element, the attachment element configured to mount the valve to one of the fastening islands by sliding the valve along a direction relative to the fastening island.

17. The valve assembly of claim 16, wherein the valve assembly further comprises a locking feature configured to lock the at least one valve on the fastening island in the mounted position.

18. The valve assembly of claim 17, wherein the flexible body comprises at least one spring element.

* * * * *